United States Patent [19]

Harmon

[11] 4,309,938
[45] Jan. 12, 1982

[54] SMOKER DEVICE

[76] Inventor: John R. Harmon, 2421-4 Abbey Dr., Fort Wayne, Ind. 46815

[21] Appl. No.: 153,078

[22] Filed: May 27, 1980

[51] Int. Cl.³ ............................................. A23B 4/04
[52] U.S. Cl. ..................................... 99/477; 198/603
[58] Field of Search ................. 99/477, 467, 473–476, 99/481, 443 C, 446, 478; 427/248 R; 426/235; 126/376; 198/603

[56] References Cited

U.S. PATENT DOCUMENTS

| 1,337,974 | 4/1920 | Casey | 99/477 |
| 1,534,867 | 4/1925 | Peschke | 99/477 |
| 2,015,388 | 9/1935 | Thomas | 99/477 |
| 2,136,124 | 11/1938 | Berger | 99/477 |
| 2,141,578 | 12/1938 | Wellmar | 198/603 |
| 3,643,587 | 2/1972 | Harrington | 99/477 |

Primary Examiner—Edward J. McCarthy
Attorney, Agent, or Firm—Woodard, Weikart, Emhardt & Naughton

[57] ABSTRACT

A smoker device including a smoke chamber, a smoke generator mounted to the bottom of the chamber, and a plurality of conveyors positioned to move food through the smoke chamber in an alternating path from an entry opening to an exit opening. The associated ends of successive conveyors have complementary shaped portions to provide for the food to be inverted as it passes from a first conveyor to a second conveyor and to inhibit overlapping or other disarray of the food as it passes from one conveyor to the next.

5 Claims, 5 Drawing Figures

SMOKER DEVICE

BACKGROUND OF THE INVENTION

1. Field of the Invention

The present invention relates to a device for the smoking of meat, fish and other food products, and more particularly relates to a simple, efficient and compact smoker device.

2. Description of the Prior Art

Smokehouses and associated smoking apparatus have been known in the art for some time. The smoking of meat, fish and other foods has been recognized as a method of curing foods, and also as a means to impart desirable flavor to such foods. Various apparatus have been utilized in the art for this purpose.

In U.S. Pat. No. 1,337,974, issued to Casey on Apr. 20, 1920, there is disclosed a food curing and smoking apparatus. The Casey apparatus includes a smoke chamber within which several vertically spaced conveyor belts are positioned. The direction of travel of the belts alternates such that food is passed back and forth through the smoke chamber until it is removed at an exit port. A smoke generator is located near the smoke chamber and a valved duct connects the generator to the chamber. A second duct connects the opposite end of the chamber with the generator to provide recirculation.

A smokehouse design is disclosed in U.S. Pat. No. 1,534,867, issued to Peschke et al. on Apr. 21, 1925. The Peschke smokehouse includes a wheeled carriage which is transported by means of a conveyor through a smoke chamber, the smoke being provided by fires located beneath the smoke chamber. In U.S. Pat. No. 1,229,298, issued to Lenzke on June 12, 1917, there is also disclosed a smoke house which provides for transporting the food to and from the smoke chamber by means of a wheeled carriage.

A device for the treatment of cereals is disclosed in U.S. Pat. No. 2,015,388, issued to Thomas on Sept. 24, 1935. The cereals are fed onto a first conveyor portion and passed through the treating unit to an exit port. The Thomas device includes a conveyor which provides for movement of the cereals through the chamber in several, alternating directions. The Thomas device, however, does not contemplate the smoking of the cereal.

Although various units and devices have been known in the prior art for smoking foods, certain disadvantages are associated with such devices in particular applications. The Casey apparatus, for example, is complex in construction and bulky in size and is primarily suited for large scale operations. The Peschke and Lenzke smoke houses are similarly complex and bulky, and are inconvenient for use on a small scale. The present invention provides a smoker device which is simple in construction, compact, reliable and easily operated. The minimal expense and the compactness of the present invention make it excellently suited for use in smaller operations, such as restaurants.

SUMMARY OF THE INVENTION

The present invention provides a simple, compact and easily operated smoker device which comprises a smoke chamber including a plurality of generally-horizontal vertically spaced conveyors which travel in alternating directions to pass the meat or other food through the smoke chamber in a path to provide full smoking of the food. The conveyor belts are driven by a motor mounted beneath the smoke chamber, and a smoke generator is also mounted beneath the chamber.

It is an object of the present invention to provide a smoker device which is simple and compact in design.

A further object of the present invention is to provide a smoker device which provides for passing the food to be smoked through the smoke chamber in differing directions, and further provides for inverting the food as it progresses through the chamber.

It is a another object of the present invention to provide a smoker device which is easily operated and may be readily controlled to provide the desired amount of smoking for food.

It is further object of the present invention to provide a smoker device which includes a smoke generator which is convenient to use, and which provides for the collection and disposal of ashes generated in producing the smoke.

It is another object of the present invention to provide a smoker device which includes an auxiliary fan for clearing the chamber of smoke to facilitate access to the interior of the chamber.

Other objects and advantages of the present invention will become apparent from the description of the preferred embodiment which follows.

DESCRIPTION OF THE PREFERRED EMBODIMENT

Figure 1:
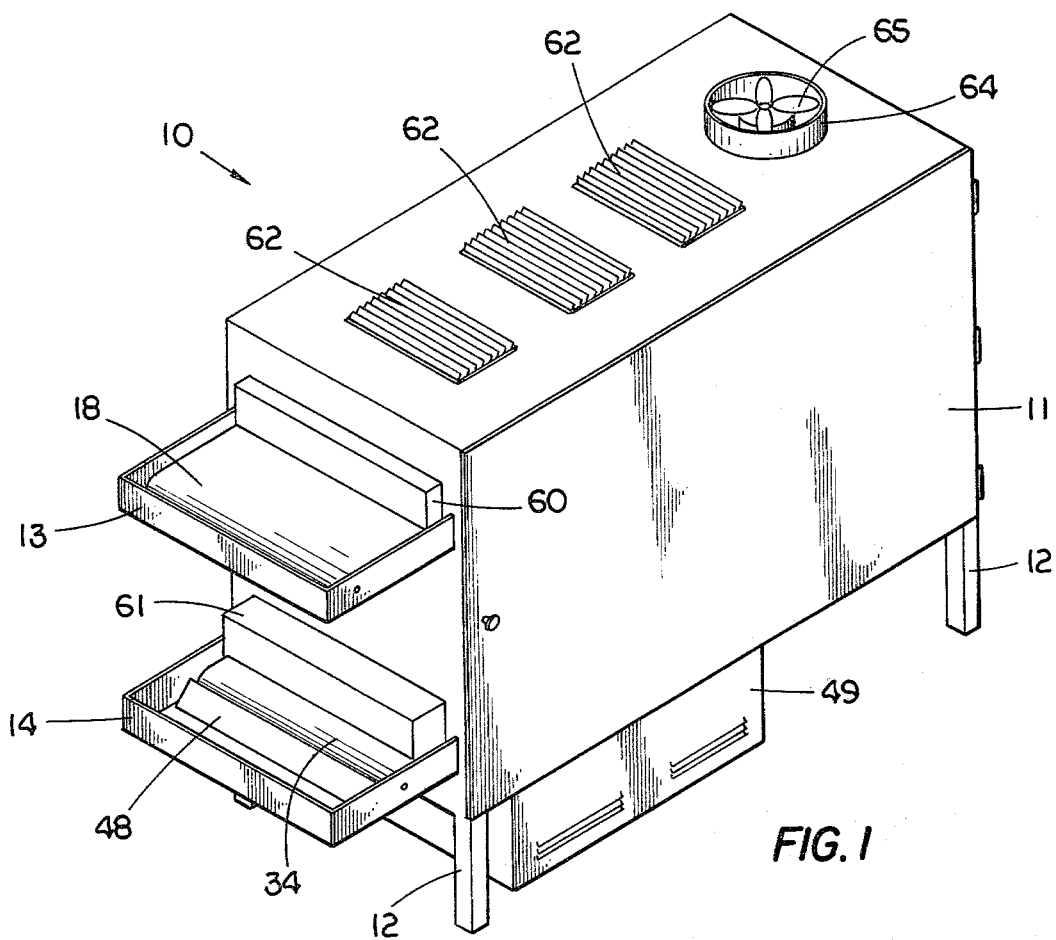
FIG. 1 is a perspective view of a smoker device constructed in accordance with the present invention.
Figure 3:
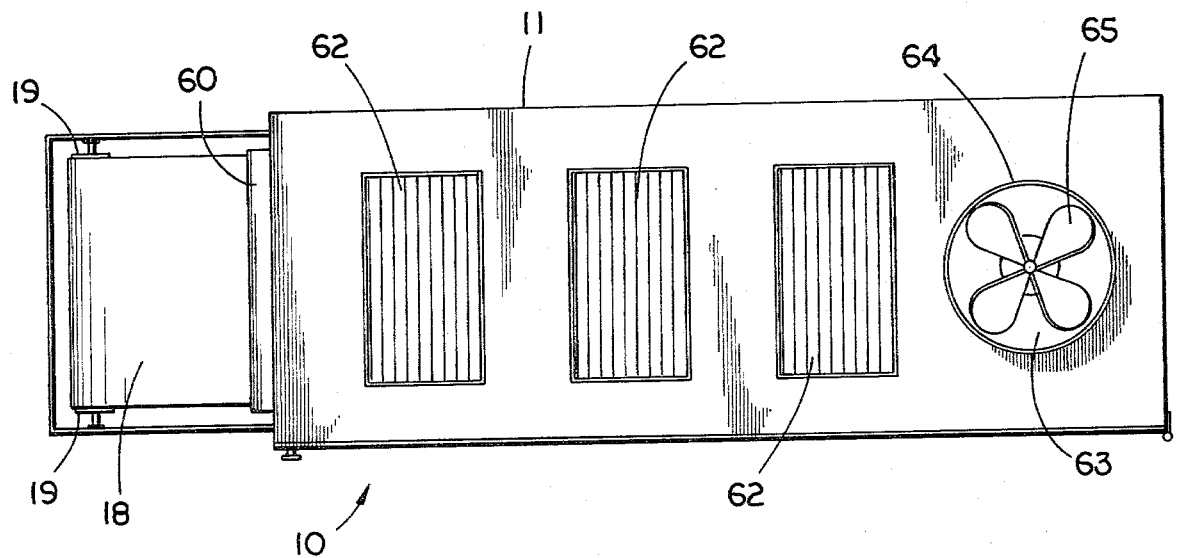
FIG. 3 is a top, plan view of the smoker device of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a smoker device 10 including a smoke chamber 11 mounted upon legs 12 for support. Smoker chamber 11 may assume any desired shape, but is advantageously constructed as a rectangular unit supported upon four legs. Smoker device 10 further includes an entry tray 13 and an exit tray 14 mounted to the front wall of the smoke chamber 11. These trays may be provided with removable bottoms, or may otherwise be modified to facilitate cleaning.

A motor chamber 15 is mounted to the bottom of the smoke chamber and contains a motor 16 secured thereto. Motor 16 is connectable to a suitable power source, and is desirably provided with an on/off switch 17 mounted to the front wall of the smoke chamber. A plurality of conveyor belts are mounted within the smoke chamber 11 to transport the food through the chamber for smoking. A first conveyor 18 has its front end mounted over a pulley 19 secured as by rod 20 to the sides of the entry tray 13. Pulley 19, and similarly the other pulleys as will be further described, may be mounted to the walls of the trays and/or smoke chamber in any suitable manner as is well understood. For example, the pulley may be received upon a rod 20 which extends the width of the tray 13 and which is welded to the side walls of the tray. Alternatively, the rod may be mounted in suitable brackets secured to the tray walls either by welding, bolts, or other securing means.

Conveyor belt 18 extends about a pair of pulleys 19 at the front of the smoker device, and further extends about a second pair of pulleys 21 mounted at the rear of the smoker chamber. It is to be understood that each of the pulleys and wheels depicted in FIG. 2 has a complementary one on the other side of the smoke chamber. These pairs are identically positioned and mounted, and therefore only one of each pair is described in detail herein. A guide wheel 22 is provided to give the appropriate shape to the conveyor belt 18. In addition, the guide wheel 22 could be spring biased to adjust the tension in conveyor belt 18 as is well understood. Pulley 21 includes an outer guide portion 23 about which the conveyor belt 18 is received. Pulley 21 further includes a smaller drive portion 24 which is utilized for the driving connection with motor 16, as will be further described below.

A second conveyor belt 25 is also mounted within smoke chamber 11. Conveyor belt 25 extends over a first pulley 26 which is mounted in a fashion comparable to that of pulley 19. The conveyor belt further extends at the opposite end around a pulley 27 similarly mounted to the smoke chamber 11. Adjacent pulley 27 is a guide wheel 28 which cooperates with pulley 27 in the same fashion as guide wheel 22 cooperates with pulley 21 to shape and tension the conveyor belt 25.

A guide member 29 is provided to form conveyor belt 25 in an arcuate shape at the location proximate to pulley 21 of conveyor belt 18. Guide member 29 includes a first portion 30 which extends inwardly from the side wall of smoke chamber 11 and against which the adjacent portion of conveyor belt 25 rests. A similar portion 31 of guide member 29 extends inwardly of the side wall of the smoke chamber, and the adjacent portion of conveyor belt 25 rests against guide portion 31. In this manner, the conveyor belt 25 is given an arcuate shape which is generally concentric to pulley 21 and the portion of conveyor belt 18 which extends over pulley 21. This shaping of the conveyor belt along with the enlarged guide portion 23 of pulley 21 provides a cylindrical space 32 therebetween. As a result, the meat or other food carried upon conveyor belt 18 will pass into the space and will be caused to invert as it is passed on to conveyor belt 25.

The cooperating shapes of conveyor belts 18 and 25 provide specific advantages in the operation of the smoker device 10. As mentioned, the food will be caused to invert as it passes from conveyor belt 18 to conveyor belt 25, thus providing a fuller and more even smoking of the food. In addition, the arcuate portion of conveyor belt 25 will reduce or eliminate the tendency of the food to become bunched, folded or otherwise disarrayed, and also will reduce the likelihood that the foods will become overlapped. Other modifications of the device could also be made in respect to this arrangement. For example, the guide member 29 could be replaced with a number of pulleys or guide wheels appropriately located. In addition, the portions 30 and 31 could include guide wheels over which the conveyor belt 25 is received. In another aspect, the conveyor belts could be constructed to provide relative movement which would permit adjustment of the space 32 to accommodate various sizes of food.

Figure 2:
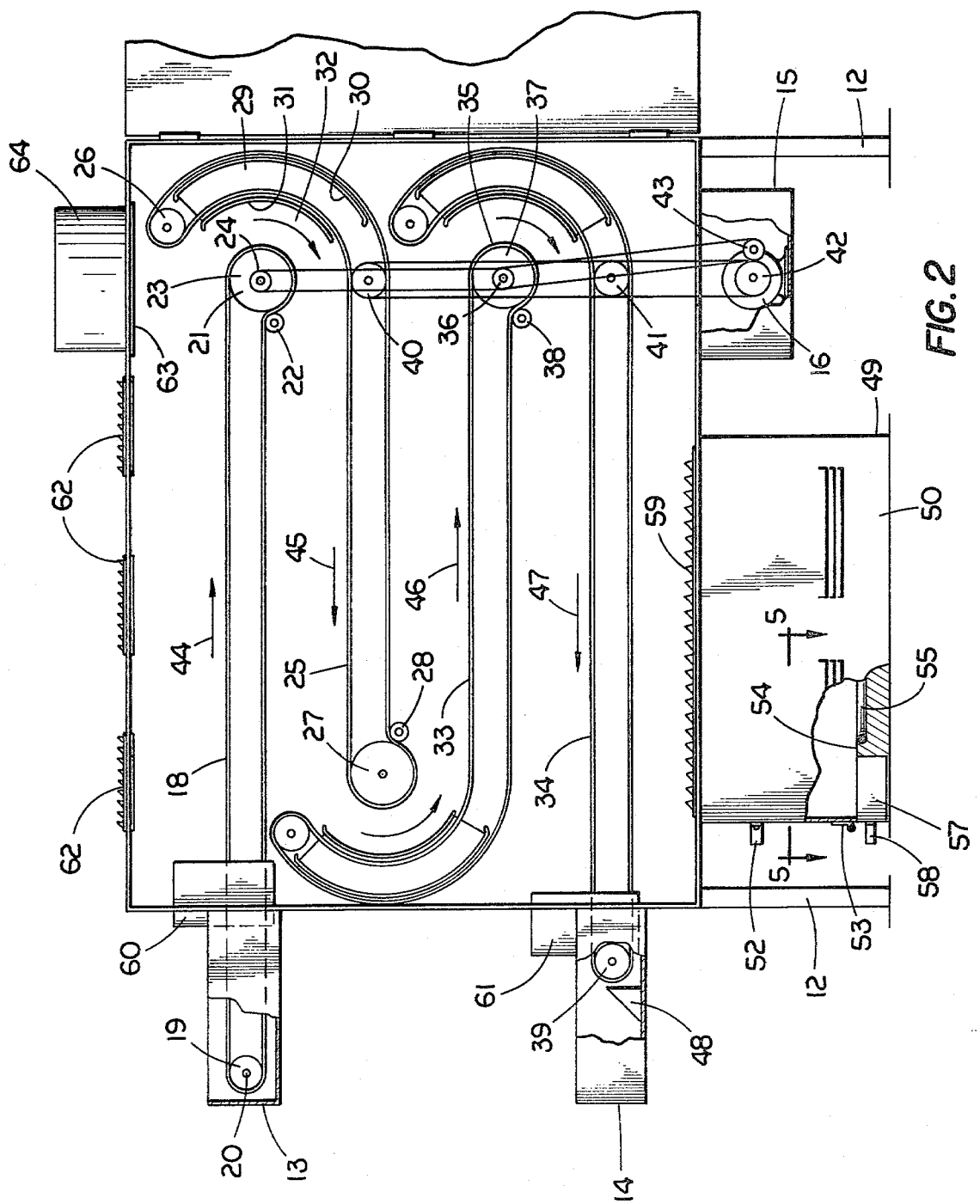
FIG. 2 is a side view of the smoker device of FIG. 1, with the hinged side door in the open position.
Figure 4:
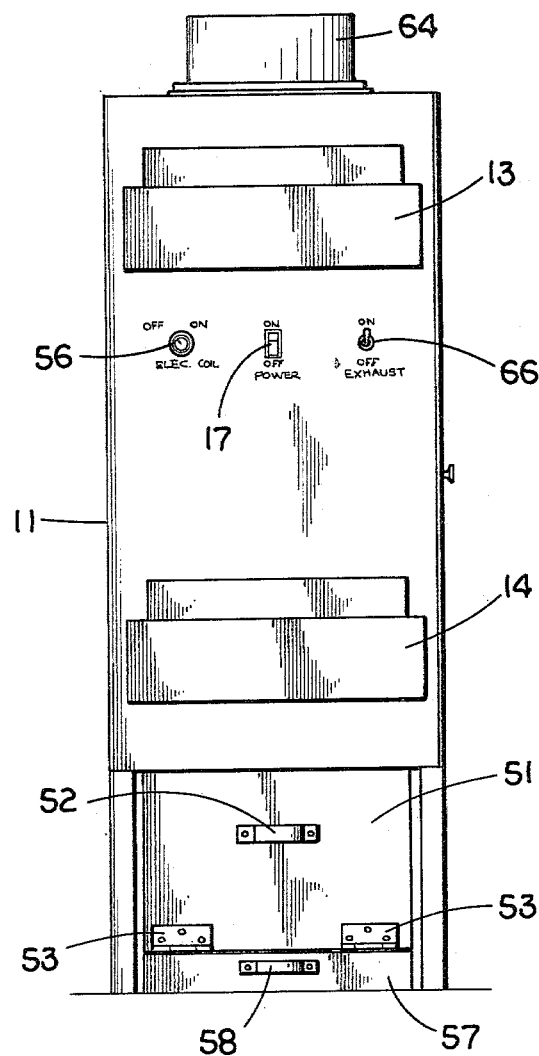
FIG. 4 is a front, elevational view of the smoker device of FIG. 1.
Figure 5:
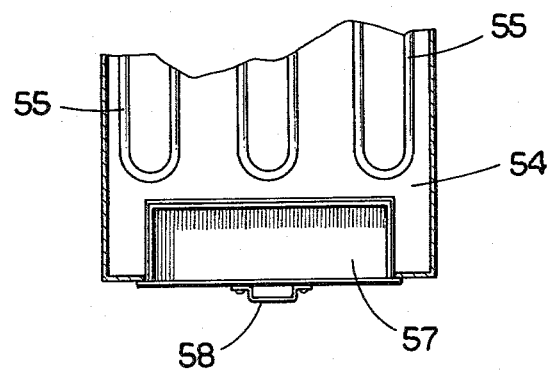
FIG. 5 is a top, plan view of the smoke generator, taken along the line 5—5 of FIG. 2.

As particularly shown in FIG. 2, additional conveyor belts 33 and 34 are mounted within the smoke chamber 11 to further transport the food ultimately to the exit tray 14. It will be appreciated that the mounting of conveyor belt 33 is comparable to that for conveyor belt 25, and a full description of such mounting is therefore not believed to be necessary. This is similarly true for the mounting of conveyor belt 34. It should be noted that conveyor belt 33 includes a pulley 35 which is identical to pulley 21, and which therefore includes a smaller, drive portion 36, and a larger, guide portion 37 which cooperates with guide wheel 38 to provide the proper profile for the shape of the conveyor belts. Conveyor belt 34 includes an arcuate portion in all respects identical with that of conveyor belt 25, and further includes an end pulley 39 comparable to pulley 19 of conveyor belt 18.

Drive pulleys 40 and 41 are mounted to smoke chamber 11 and are positioned to drive the conveyor belts 25 and 34, respectively. Each of the drive pulleys 40 and 41, and the drive portions 24 and 36 of pulleys 21 and 35, respectively, are of identical configuration and drive their respective conveyors at the same speed. Alternatively, the pulleys may have different dimensions, and may drive the conveyor belts at different rates, but it is generally preferred that the conveyor belts each travel at the same rate of speed to provide evenness of smoking.

Motor 16 is equipped with a pair of drive gears 42 and 43 which engage one another to provide opposite directions of rotational movement. The two directions of movement are utilized to drive the conveyors in alternate directions. As is particularly shown in FIG. 2, drive gear 42 rotates in a clockwise direction and is drivingly connected directly to drive portion 36 of pulley 35. This drive portion 36 is in turn drivingly connected to drive portion 24 of pulley 21. Drive gear 43 rotates in a counterclockwise direction, as viewed in FIG. 2, and is drivingly connected directly to drive pulley 41. Drive pulley 41 is in turn drivingly connected to drive pulley 40. As a result of these interconnections, the conveyor belts 18, 25, 33 and 34 are driven in the directions 44–47, respectively. Therefore, food placed upon conveyor belt 18 at the entry tray 13 will pass consecutively over conveyor belts 18, 25, 33 and 34 and then pass onto the inclined take off ramp 48 and into the exit tray 14.

Mounted to the bottom of the smoke chamber 11 is a smoke generator 49 including a housing 50. A door 51 having a handle 52 is hingedly mounted by hinges 53 to the housing 50, and provides access to the interior thereof. Smoke generator 49 includes a floor 54 within which heating coils 55 are received. The heating coils 55 are configured to provide suitable heat at the floor of the smoke generator to produce smoke from wood chips or other materials placed into the unit. These coils are preferably recessed in the floor 54 to provide a generally uniform, flat surface for reception of the wood chips or material. Alternatively, the coils could be received underneath a surface which would suitably transmit the heat to the wood chip materials for smoke production. The heating coils are connected to a suitable power source, and also are preferably wired to an on/off switch 56 mounted to the front panel of the smoke chamber 11.

A drawer 57 having a handle 58 is received within an opening in the front of housing 50. Drawer 57 preferably has a height equal to the height of the floor 54, and is provided to facilitate removal of the ashes generated by the smoke chips. Such ashes or other debris may simply be swept or pushed into the drawer 57 which may then be removed for disposing of such debris.

Housing 50 is mounted to smoke chamber 11 in any suitable manner, such as by bolts or by welding. Vents 59 are positioned in the sides of smoke chamber 11 above the smoke generator 49 to permit passage of the smoke into the smoke chamber. From the smoke generator the smoke will pass into the chamber and generally fill the chamber fully. Housings 60 and 61 are provided to surround the openings adjacent the entry and exit trays to reduce smoke loss at these locations. In addition, flaps or other devices could be used to further close these openings to minimize smoke escape.

Vents 62 are provided in the top of smoke chamber 11 to permit moderate escape of smoke therefrom. It will be appreciated that the vents 59 and 62 could be made to be adjustable, thereby permitting further control of the movement of smoke into and out of the smoke chamber 11. A further vent 63 is located in the top of the smoke chamber and is surrounded by a cylindrical chamber 64. Mounted above the vent 63 and within chamber 64 is an exhaust fan 65 which is connected to a suitable source of power and preferably is wired to an on/off switch 66 mounted on the front panel of smoke chamber 11. Fan 65 is particularly useful as a means to remove smoke quickly from the interior of the chamber when access to the interior is required. Alternatively, the vents 62 may be eliminated and vent 63 in connection with fan 65 may be utilized as the primary escape for smoke from the chamber. This could advantageously be accomplished with the use of a multi-speed fan which would operate at a reduced speed for normal smoke venting, and at a higher speed to evacuate the chamber for access purposes.

The smoker device of the present invention is very simple to operate. The heating coils are turned on, thus bringing the coils to a temperature just hot enough to make chips of wood smoke and smolder, but low enough to prevent the wood from flaming up and the meat from cooking. The access door to the smoke generator is then opened and a desired amount of wood chips are placed in the generator on the heating coils. The wood will begin smoking and the smoke will flow into the smoke chamber and out the vents at the top. Once the smoke chamber is suitably filled with smoke, the motor, and therefore the conveyor belts, are activated and the meat, fish or other food is placed on the conveyor belt in the entry tray. The food will be carried to the end of the first conveyor belt 18, and will pass adjacent the complementary curved portions of conveyor belts 18 and 25 until it assumes a position on the second conveyor belt 25. In doing so, the food typically will be inverted from its position on the first conveyor belt, and thus the smoking of the food will be evenly distributed. The food will in turn travel along conveyor belts 25, 33 and 34 and finally will be deposited in the exit tray. It will be understood that if the food will not be removed upon exiting the smoke chamber, then the exit tray may desirably be made deeper to receive and contain a number of food items. If at any time access to the smoke chamber is desired, then the exhaust fan may be activated or switched to a faster mode to evacuate the smoke from the chamber. It will be appreciated that proper ducting may be utilized to provide air to the smoke generator, and also to vent the smoke from the top. The period of time for which the food is retained in the smoke chamber may be varied, particularly by altering the length of the conveyor belts or the speed of the motor. Of course, once a particular unit has been constructed, the residence time is most suitably controlled by varying the speed of the motor and therefore of the conveyor belts, and this may be achieved by any conventional manner. As an example, the desired residence time for food which has not yet been cooked may be 5-10 minutes whereas food which is already cooked may be desired to remain in the smoke chamber for only a couple of minutes.

While a particular preferred embodiment of the present invention has been described herein, other variations are contemplated and would be encompassed by the present invention. In general, various conveyor belt types and means for mounting such conveyor belts could be utilized equally well with the present invention. An example of a conveyor belt particularly useful with this invention is the type of belt presently used in cooking facilities. Such conveyor belts may include metal rods which extend the width of the belt, or flexible chain meshes. The conveyor belts and other components of the smoker device 10 may be formed from a variety of materials, with stainless steel and other materials recognized as particularly adapted for food handling purposes being preferred. In addition, rails on the conveyor belts or appropriate members attached to the sides of the smoke chamber may be used to insure that the food is retained properly on the conveyor belts. Also, the spacing of the conveyor belt members may vary, it naturally being important that the spacing not be so great that food which would be used with this smoke chamber would not be suitably supported on the conveyor belts.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A smoker device which comprises:
 a smoke chamber having a bottom;
 a smoke generator mounted adjacent the bottom of said smoke chamber and communicating therewith;
 a first conveyor mounted within said smoke chamber and having a first receiving end and a second delivering end, said smoke chamber defining an entry opening and the receiving end of said first conveyor being located adjacent the entry opening;
 a plurality of intermediate conveyors mounted within said smoke chamber, a first of said intermediate conveyors being positioned adjacent said first conveyor, said first intermediate conveyor having a main portion located below and spaced apart from said first conveyor and further having a second portion spaced adjacent and shaped complemen- tary to the delivering end of said first conveyor, the main portion terminating in a delivering end, each successive one of said intermediate conveyors including a main portion adjacent and spaced below the preceding one of said intermediate conveyors and terminating in a delivering end, each successive one of said intermediate conveyors further including a second portion spaced adjacent and shaped complementary to the delivering end of the preceding one of said intermediate conveyors;

a delivery conveyor mounted within said smoke chamber, said delivery conveyor including a main portion terminating in a delivering end, the main portion being located below and spaced apart from a final one of said intermediate conveyors, said delivery conveyor further including a second portion spaced adjacent and shaped complementary to the delivering end of the final one of said intermediate conveyors;

said smoke chamber defining an exit opening and the delivering end of said delivery conveyor being located adjacent the exit opening;

means to drive said first and delivery conveyors to transport carried material in a direction from the first end to the second end and to drive each of said intermediate conveyors to transport carried material in a direction from the second, complementary-shaped portion to the main portion.

2. The smoker device of claim 1 in which the receiving end of said first conveyor extends through the entry opening and the delivering end of said delivery conveyor extends through the exit opening.

3. The smoker device of claim 1 and which further includes means for retaining food on the conveyors to prevent the food from falling off the sides of said conveyors.

4. The smoker device of claim 1 in which the drive means includes a drive motor, a first gear mounted upon said drive motor and a second gear mounted to engage the first gear, the first and second gears being drivingly connected to said conveyors.

5. The smoker device of claim 1 in which said drive means is for driving each of the conveyors at the same rate.

* * * * *